(12) United States Patent
Klebanov et al.

(10) Patent No.: US 8,004,617 B2
(45) Date of Patent: Aug. 23, 2011

(54) STAND-BY MODE TRANSITIONING

(75) Inventors: Ilya Klebanov, Thornhill (CA); Kwok P. Hui, Langhorne, PA (US)

(73) Assignee: ATI Technologies ULC, Markham, Ontario (CA)

( * ) Notice: Subject to any disclaimer, the term of this patent is extended or adjusted under 35 U.S.C. 154(b) by 1215 days.

(21) Appl. No.: 11/514,056

(22) Filed: Aug. 30, 2006

(65) Prior Publication Data

US 2008/0060041 A1    Mar. 6, 2008

(51) Int. Cl.
*H04N 5/63* (2006.01)
(52) U.S. Cl. ........................................................ 348/730
(58) Field of Classification Search .................. 348/730, 348/552, 553, 554; 713/323, 106, 310, 320, 713/300, 322; 455/574, 573
See application file for complete search history.

(56) References Cited

U.S. PATENT DOCUMENTS

| | | | | |
|---|---|---|---|---|
| 5,167,024 | A * | 11/1992 | Smith et al. | 713/322 |
| 5,502,689 | A * | 3/1996 | Peterson et al. | 368/156 |
| 5,659,762 | A * | 8/1997 | Sawada et al. | 713/323 |
| 5,808,693 | A * | 9/1998 | Yamashita et al. | 348/554 |
| 6,584,571 | B1 * | 6/2003 | Fung | 713/310 |
| 6,861,956 | B2 * | 3/2005 | Ying | 340/825.69 |
| 6,900,625 | B2 * | 5/2005 | Chevallier et al. | 323/284 |
| 7,039,755 | B1 * | 5/2006 | Helms | 711/106 |
| 7,412,615 | B2 * | 8/2008 | Yokota et al. | 713/323 |
| 7,505,795 | B1 * | 3/2009 | Lim et al. | 455/574 |
| 7,706,844 | B2 * | 4/2010 | Ranta | 455/574 |
| 2006/0059380 | A1 | 3/2006 | Kimura | |
| 2007/0043963 | A1 * | 2/2007 | Cheng et al. | 713/320 |

FOREIGN PATENT DOCUMENTS

| | | |
|---|---|---|
| CN | 1156379 | 8/1997 |
| EP | 1 341 380 | 9/2003 |

OTHER PUBLICATIONS

Energy Star, "Energy Star Program Requirements for Computers", Final Draft Version 4.0, pp. 8.
Hewlett-Packard Corporation et al., "Advanced Configuration and Power Interface Specification", Revision 3.0b, (Oct. 10, 2006).
Micronas, "MDE 9517D, MDE 9518D Digital Decoder for DVB Set-Top Boxes and IDTV Sets", Retrieved from http://www.micronas.com/products/by_function/mde_9517_18d/documents_and_downloads/index.html?doc=280767, (Nov. 2004).
Wikipedia, "Advanced Configuration and Power Interface", Retrieved from http://en.wikipedia.org/w/index.php?title=Advanced_Configuration_and_Power_Interface&oldid=71295477, (Aug. 23, 2006).

* cited by examiner

*Primary Examiner* — Paulos M Natnael
(74) *Attorney, Agent, or Firm* — Volpe and Koenig, P.C.

(57) ABSTRACT

A device for rapidly instituting an active mode of a digital-television enabled system, the system including a first, volatile memory configured to load and store software instructions, includes: an input configured to receive first digital audio and video information; a first output configured to convey second audio and information toward a display regarding the first audio and video information; at least one second output configured to convey commands to, and receive information from, the first memory; and a processor configured to perform functions in accordance with software instructions stored in first and second memories and to cause the first memory to load software instructions for provision to the processor such that first instructions for processing at least one of the first audio information and the first video information are loaded and stored by the first memory with a higher priority than second instructions for performing other functionality.

12 Claims, 4 Drawing Sheets

STAND-BY MODE TRANSITIONING

BACKGROUND

Digital-television-enabled devices are in widespread and rapidly expanding use. Modern digital-television-enabled devices offer a wide spectrum of user accessible features, extending the use of such devices beyond just providing television programs. For example, some devices provide multimedia viewers, provide digital slide show capability, provide network connectivity, and/or have built-in personal video recording capabilities. The extensive features sets often use a flexible operating system, such as Linux®, with different embedded services and a built-in file system.

As technology progresses, and features sets expand, televisions use more and more complex devices to control the different applications against a backdrop of competing demands for space and power use. Despite increased functionality of control devices, it is desirable to maintain, if not reduce, the size of the controller devices. Improvements in manufacturing technology have reduced cost and size of such devices, but with an increase in leakage current (i.e., current drawn by a device when powered, but idle). Concurrently, there is a strong desire for power consumption reduction, including limits on system power allowance in various operational states (e.g., Energy Star NA). To comply with power consumption desires, the control devices are typically powered off during system stand-by mode. Thus, to transition from stand-by mode to active mode, a cold boot of the control device is performed, which typically results in a significant time delay between active mode actuation and the appearance of an image on a television screen.

SUMMARY

In general, in an aspect, the invention provides a device for rapidly instituting an active mode of a digital-television enabled system, the system including a first, volatile memory configured to load and store software instructions, the device including: an input configured to receive first digital audio information and first digital video information; a first output configured to be coupled to a display and to convey second audio information and second video information toward the display regarding the first audio information and the first video information; at least one second output configured to be coupled to the first memory and to convey commands to, and receive information from, the first memory; and a processor configured to be coupled to the first memory and to a second memory and configured to perform functions in accordance with software instructions stored in the first memory and the second memory, the processor being further configured to cause the first memory to load software instructions for provision to the processor such that first instructions for processing at least one of the first audio information and the first video information are loaded and stored by the first memory with a higher priority than second instructions for performing other functionality.

Implementations of the invention may include one or more of the following features. The processor is configured to cause the first memory to load the software instructions for provision to the processor such that the first instructions are loaded and stored by the first memory before the second instructions. The processor is configured to cause the first memory to load the software instructions for provision to the processor such that the first instructions are loaded and stored by the first memory in parallel with the second instructions being loaded and stored but before completion of loading and storing of the first instructions, the second instructions are loaded and stored only if loading and storing of the first instructions is not inhibited by the loading and storing of the second instructions. The first memory is a DRAM.

In general, in another aspect, the invention provides a device for rapidly instituting an active mode of a digital-television enabled system, the device including an input configured to receive first digital audio information and first digital video information, a first output configured to be coupled to a display and to convey second audio information and second video information toward the display regarding the first audio information and the first video information, at least one second output configured to be coupled to volatile memory and to convey commands to, and receive information from, the volatile memory, and a processor configured to perform functions in accordance with software instructions, wherein the processor is configured to, in response to a request to institute the active mode of the system, cause the volatile memory to activate initial software stored in the system during a stand-by mode of the system.

Implementations of the invention may include one or more of the following features. The processor is configured cause the volatile memory to initiate a self-refresh mode of the volatile memory. The processor is configured to cause the volatile memory to store a current software state as the initial software. In order to cause the volatile memory to activate the initial software, the processor is configured to cause the volatile memory to re-activate the initial software. The processor is configured to cause the volatile memory to load the initial software from a non-volatile memory.

In general, in another aspect, the invention provides an integrated circuit chip for processing graphical information and for rapidly instituting an active mode of a digital-television enabled system, the system including a first, volatile memory configured to load and store software instructions, the integrated circuit chip including: an input configured to receive first digital audio information and first digital video information; a first output configured to be coupled to a display and to convey second audio information and second video information toward the display regarding the first audio information and the first video information; at least one second output configured to be coupled to the first memory and to convey commands to, and receive information from, the first memory; a second memory; and a processor coupled to the second memory and configured to be coupled to the first memory and configured to perform functions in accordance with software instructions stored in the first memory and the second memory, the processor being further configured to, in response to a request to institute an active mode of the system, at least one of: cause the first memory to load software instructions for provision to the processor such that first instructions for processing at least one of the first audio information and the first video information are loaded and stored by the first memory with a higher priority than second instructions for performing other functionality; and cause the first memory to activate initial software stored in the system during a stand-by mode of the system.

Implementations of the invention may include one or more of the following features. The processor is configured cause the first memory to initiate a self-refresh mode of the first memory. The processor is configured to cause the first memory to load the initial software from a non-volatile memory.

In accordance with implementations of the invention, one or more of the following capabilities may be provided. Time from active mode actuation of a digital television until display of an image can be reduced. Power consumption for stand-by mode of a digital television can be reduced, e.g., such that power consumption limitations for stand-by mode of a digital television can be met.

These and other capabilities of the invention, along with the invention itself, will be more fully understood after a review of the following figures, detailed description, and claims.

DETAILED DESCRIPTION OF PREFERRED EMBODIMENTS

Embodiments of the invention provide techniques for transitioning from a stand-by-mode to an active mode in a digital-television-enabled device. For example, a controller for a digital television can set a memory to self-refresh mode when transitioning from active to stand-by-mode to preserve a software state in the memory. Upon transitioning from stand-by mode to active mode, the preserved software state is reactivated and used. Further, functionality provided for by software to activate television features such as audio and/or video can be activated in a relatively higher priority fashion with other features activated with a lower priority. Further still, a desirable software state can be stored in non-volatile memory and reloaded into executable memory upon transitioning from stand-by mode to active mode. This embodiments are exemplary, however, and not limiting of the invention as other implementations in accordance with the disclosure are possible.

Figure 1:
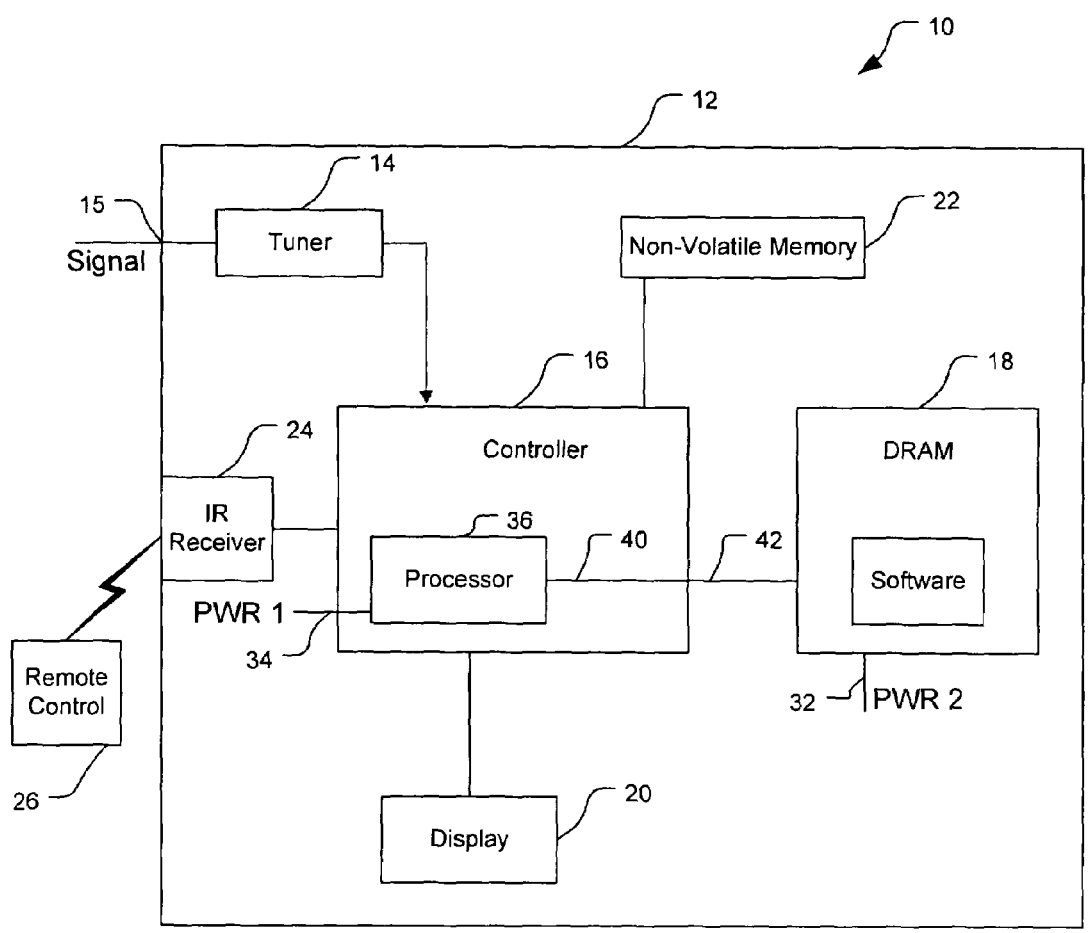
FIG. 1 is a block diagram of a digital-television-enabled system.

Referring to FIG. 1, a digital-television-enabled system 10, here a digital television, includes a housing 12, a tuner 14, a controller 16, a dynamic random access memory (DRAM) 18, a display 20, a non-volatile memory 22, and an infrared (IR) receiver 24. The housing 12, e.g., here a television cabinet, is configured to hold the components shown and to provide access for connecting internal components of the system 10 to appropriate external components (e.g., game consoles, set-top boxes, DVD players, VCRs, cameras, etc.). The tuner 14 is configured to receive digital television transmissions (including digital audio information and digital video information) at an input 15 and to select one of the incoming channels of transmissions for processing and display on the display 20. The controller 16 is configured to, among other things, read information, including computer-readable, computer-executable software code instructions stored in the DRAM 18 and/or the memory 22 and to perform functions (e.g., by executing instructions) indicated by this information to process signals received from the tuner 14, as described more fully below. The display 20 is configured to provide images to a viewer in accordance with information/instructions received from the controller 16. The controller 16 is further configured to receive commands from the IR receiver 24 in accordance with signals sent from a remote control 26 to perform a variety of functions. For example, the controller 26 can change a state of the television 10 between a stand-by state, in which the television 10 appears off to a user, and an active state in which capabilities of the television 10 are available to the user. The controller 16 includes appropriate inputs/outputs for connection to the other components of the system 10. For example, the controller 16 may be an integrated circuit chip with pins connectors for the inputs/outputs. For example, the controller 16 may be a Xilleon® chip made by ATI Technologies, Inc. of Markham, Ontario, Canada.

The DRAM 18 is configured to store computer-readable, computer-executable software code instructions 28. The memory 18 is volatile and the software 28 is loaded into the DRAM 18 depending upon the type of functions that are to be performed. Initially, at system start up (e.g., if the television 10 is receiving no power from a power line 30), software will be loaded into the DRAM for processing audio and video information received via the input 15, as well as for processing other information. At any given time while the television 10 is in the active state, the DRAM 18 stores a software state for processing information appropriately. The software state can vary over time as appropriate for providing for different functionality. The DRAM 18 receives power over a line 32 that is separate and independent of a power line 34 that supplies power to the controller 16.

The controller 16 includes a processor 36 that is configured to receive power from the power line 34 and to perform functions in accordance with the software 38 stored in the DRAM 18. The DRAM 18 is connected to the processor 36 via a memory bus 40 and a bus 42. The bus 42 is shown as a single logical line, but represents multiple actual lines of communication. The processor 36 is configured to perform various functions to facilitate rapid provision of television functionality (e.g., audio and/or video from signals received from the tuner 14) upon a transition from the stand-by mode to the active mode (e.g., as initiated by a command received from the remote control 26).

The processor 36 is configured to set the DRAM 18 to a self-refresh mode when the system 10 transitions to the stand-by mode. To set the DRAM 18, the processor 36 reads and executes software instructions stored and locked in a processor cache integrated within the controller 16. In response to receiving a command, e.g., from the IR receiver 24, to transition from the active mode to the stand-by mode, the processor 36 performs a sequence of functions in order to initiate the stand-by mode. As part of this sequence, the processor 36 is configured to send signals to the DRAM 18 on the lines 42 via the bus 40 to set the DRAM into a self-refresh mode before power is terminated to the processor 36 from the line 34. When set to the self-refresh mode, the DRAM 18 saves the current, active state of the software 28. For example, for a typical TV viewing, the software state provides for the source (tuner) to be received and processed, audio and video to be rendered, and system responses to user interaction to be triggered by the remote control 26. The system 10 is configured such that the DRAM 18 receives power from the power line 32 while the system 10 is in the stand-by mode. The DRAM 18 maintains the stored software state while in the self-refresh mode. In response to a command to transition to the active state from the stand-by state, the controller 16 will restore power to the processor 36. The processor 36 is configured to respond to being powered up by sending signals to the DRAM 18 to reactivate the stored state of the software 28, without having to instruct the DRAM 18, or wait for the DRAM 18, to reload appropriate software for execution by the processor 36. The processor 36 is configured to begin processing signals from the tuner 14 using the reactivated software state.

The processor 34 is further configured to control the DRAM 18 to initialize and load portions of the software 28 to be stored by the DRAM 18 in the active mode in accordance with a desired priority. For example, the processor 34 can analyze the last known functional state (e.g., the tuner was the active source), or the processor 34 can scan the available sources, determine which have available information, and select one of the available sources that has information based upon a predefined priority of sources. The processor 36 is configured to cause the DRAM to load software relevant for processing audio and/or video of signals received at the input 15 before loading software for performing other functions. The processor 36 is configured to do so in response to a request to initiate the active mode, whether the television 10 is in the stand-by mode or is completely off (i.e., no power being received via the line 30, such as if the television 10 is unplugged). The processor 36 can begin reading and executing the software instructions as they are stored in the DRAM without waiting for an entire software state to be loaded. The audio/video software is considered relatively higher priority than the relatively lower priority software for performing other functions, e.g., processing JPEG images for display. The lower-priority software can be loaded by the DRAM 18 in the background in parallel with other functions being performed by the processor 36 using the higher-priority software that has already been loaded and stored by the DRAM 18. Alternatively, the lower-priority software can be loaded in parallel with the loading of the higher-priority software, but with the higher-priority software being preferred and loaded/stored first if there are competing portions of software ready for loading/storing at the same time. Alternatively, higher-priority software and lower-priority software could be loaded in parallel, virtually simultaneously, but with the higher-priority software loaded such that the desired timing performance is achieved. Thus, the lower-priority software only gets loaded and stored if extra processing capacity is available for doing so over and above the processing capability used to load and store the higher-priority software so that loading and storing the lower-priority information does not inhibit (e.g., slow down) the loading and storing of the higher-priority information.

The processor 34 is further configured to cause the DRAM 18 to load a desired software state from the memory 22. The memory 22 is a non-volatile memory, e.g., a flash memory, that stores a software state that has been determined to be a desirable state to initialize the DRAM 18 with upon transitioning from the stand-by mode to the active mode. An exemplary desired software state would have the operating system and application software initialized, e.g., with mapped storage devices. The processor 36 is configured to respond to the initialization of the active state to cause the DRAM 18 to load and store the desirable software state from the non-volatile memory 22, instead of loading the software 28 bit by bit as part of a sequence of events to start up the DRAM This process is in lieu of a full-blown software initialization sequence comprising: reading a compressed operating system image from non-volatile memory; decompressing the image and storing the image into the RAM; initializing the operating system; loading the application software, and; initializing the application software to a known state.

Figure 2:
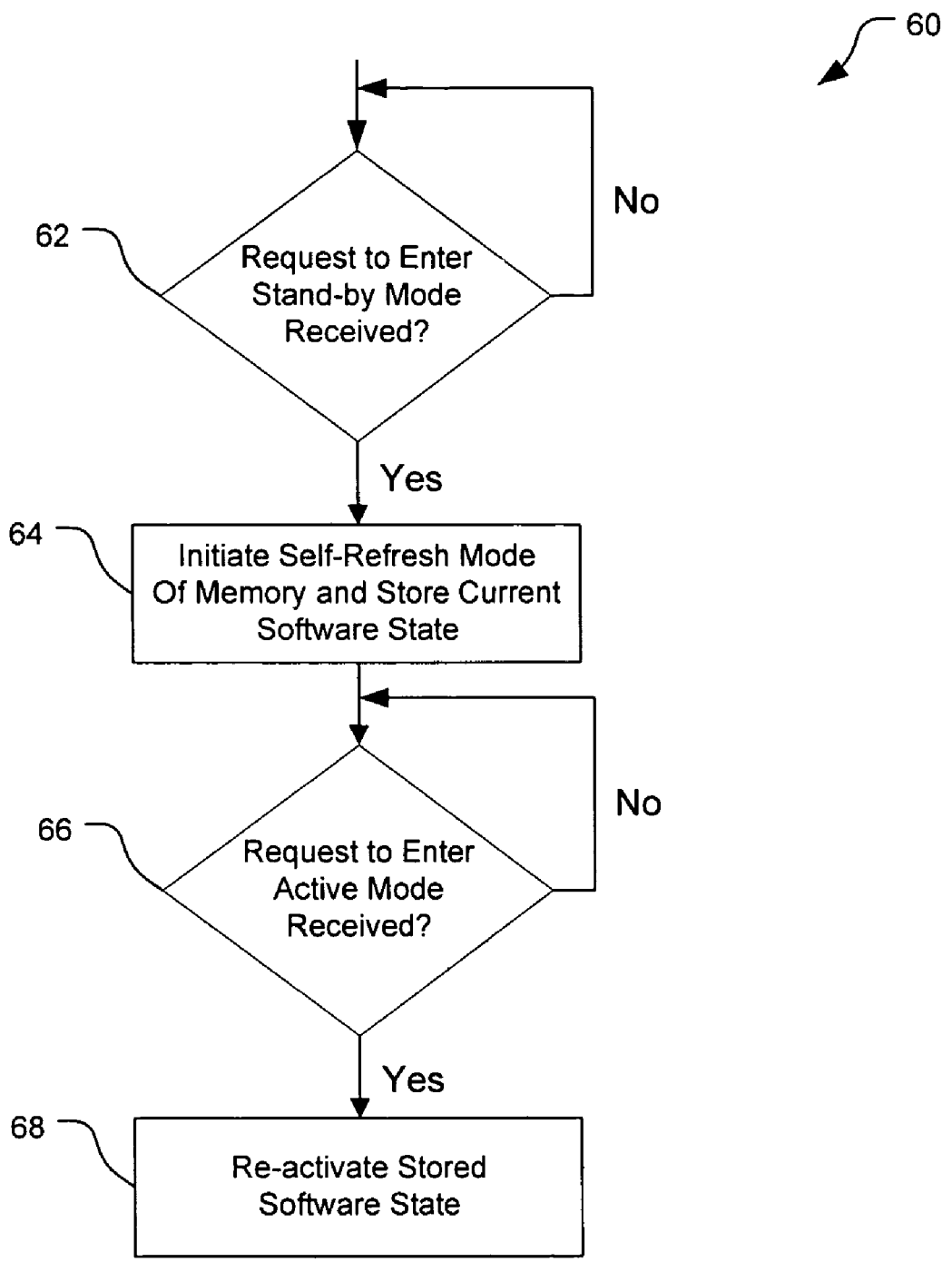
FIGS. 2-4 are block flow diagrams of processes of initiating an active mode of the system shown in FIG. 1.

In operation, referring to FIG. 2, with further reference to FIG. 1, a process 60 for initiating an active mode of the system 10 includes the stages shown. The process 60, however, is exemplary only and not limiting. The process 60 may be altered, e.g., by having stages added, removed, or rearranged.

At stage 62, the system 10 is in the active mode and monitors for a request to transition to the stand-by mode. For example, the processor 36 monitors (periodically or continuously) for an "off" command from the remote control 26 received via the IR receiver 24. If no request to change to the stand-by mode is received, the system 10 continues to monitor for such a request at stage 62. If such a request is detected, then the process 60 proceeds to stage 64.

At stage 64, in response to a stand-by mode request being detected, the processor 36 initiates a self-refresh mode in the DRAM 18. The processor 36 sends command signals to the DRAM 18 to instruct the DRAM 18 to transition to its self-refresh mode. The DRAM 18 responds my saving the current state of the software 28. The power on the line 34 is inhibited from powering the processor 36 (e.g., by being disconnected externally from the processor 36 or internally to portions of the processor 36).

At stage 66, the system 10 is in the stand-by mode and monitors for a request to transition to the active mode. For example, the processor 36 monitors (periodically or continuously) for an "on" command from the remote control 26 received via the IR receiver 24. If no request to change to the active mode is received, the system 10 continues to monitor for such a request at stage 68. If such a request is detected, then the process 60 proceeds to stage 68.

At stage 68, in response to receiving a request to enter the active mode, the processor 36 causes the DRAM software 28 to be reactivated. The processor 36 sends command signals to the DRAM 18 to instruct the DRAM to reactivate the stored state of the software 28 for reading/execution by the processor 36. The processor 36 proceeds to read and execute the reactivated software 28 for processing appropriate information, e.g., TV signals at the input 15, JPEG images, etc.

Figure 3:
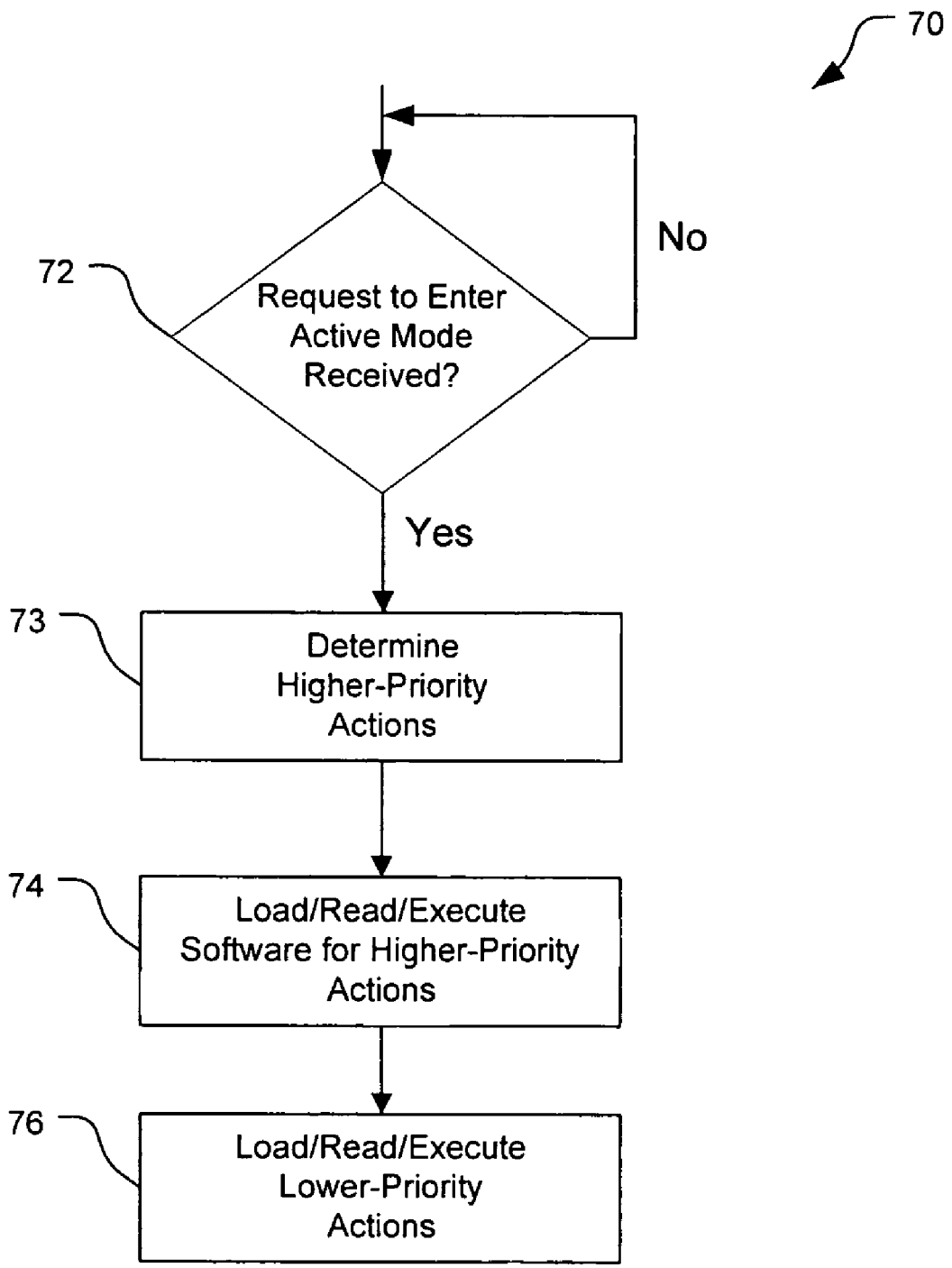

In operation, referring to FIG. 3, with further reference to FIG. 1, a process 70 for initiating an active mode of the system 10 includes the stages shown. The process 70, however, is exemplary only and not limiting. The process 70 may be altered, e.g., by having stages added, removed, or rearranged.

At stage 72, the system 10 is in the stand-by mode in which the system 10 monitors for a request to transition to the active mode. For example, the processor 36 monitors (periodically or continuously) for an "on" command from the remote control 26 received via the IR receiver 24. The monitoring may be for a very short period of time, e.g., if the system is powered up (e.g., plugged in to a wall outlet) and then shortly thereafter instructed to enter the activate mode. If no request to change to the active mode is received, the system 10 continues to monitor for such a request at stage 72. If such a request is detected, then the process 70 proceeds to stage 73.

At stage 73, the processor 36 determines higher-priority functions, and thus the higher-priority software for processing these functions. The processor 36 can determine the higher-priority functions in various ways, e.g., by examining the last known functional state, or by querying the possible information sources for which of them has information available for processing, and selecting the source with available information according to a stored ranking/priority order.

At stage 74, in response to receiving a request to enter the active mode and the determination of the higher-priority software, the processor 36 causes the higher-priority software to be loaded and reads and executes the instructions regarding the higher-priority functionality. The processor 36 sends command signals to the DRAM 18 such that the DRAM will load software instructions pertaining to the higher-priority functionality and that are part of a larger state of software instructions regarding a broader range of functionality. The processor 36 executes these instructions, preferably before causing the DRAM 18 to load the software instructions pertaining to lower-priority functions. For example, the processor 36 can read and execute instructions for processing audio and/or video information in signals received at the input 15, processing these signals, and transmitting appropriate information to the display 20 that produces corresponding sound and/or images for a user to hear/see. Alternatively, the processor 36 can cause the DRAM 18 to load software instructions for lower-priority functions when the DRAM 18 would be idle regarding providing the instructions for the higher-priority functionality to the processor 36.

At stage 76, the processor 36 causes the DRAM 18 to load the instructions for the lower-priority functionality. As discussed, this could be done after the DRAM 18 has loaded and supplied the instructions to the processor 36 for the higher-priority functions, or concurrently with providing the higher-priority functions if a lower-priority software loading operation is initiated when the DRAM 18 is not performing an action to provide the higher-priority software to the processor 36.

Figure 4:
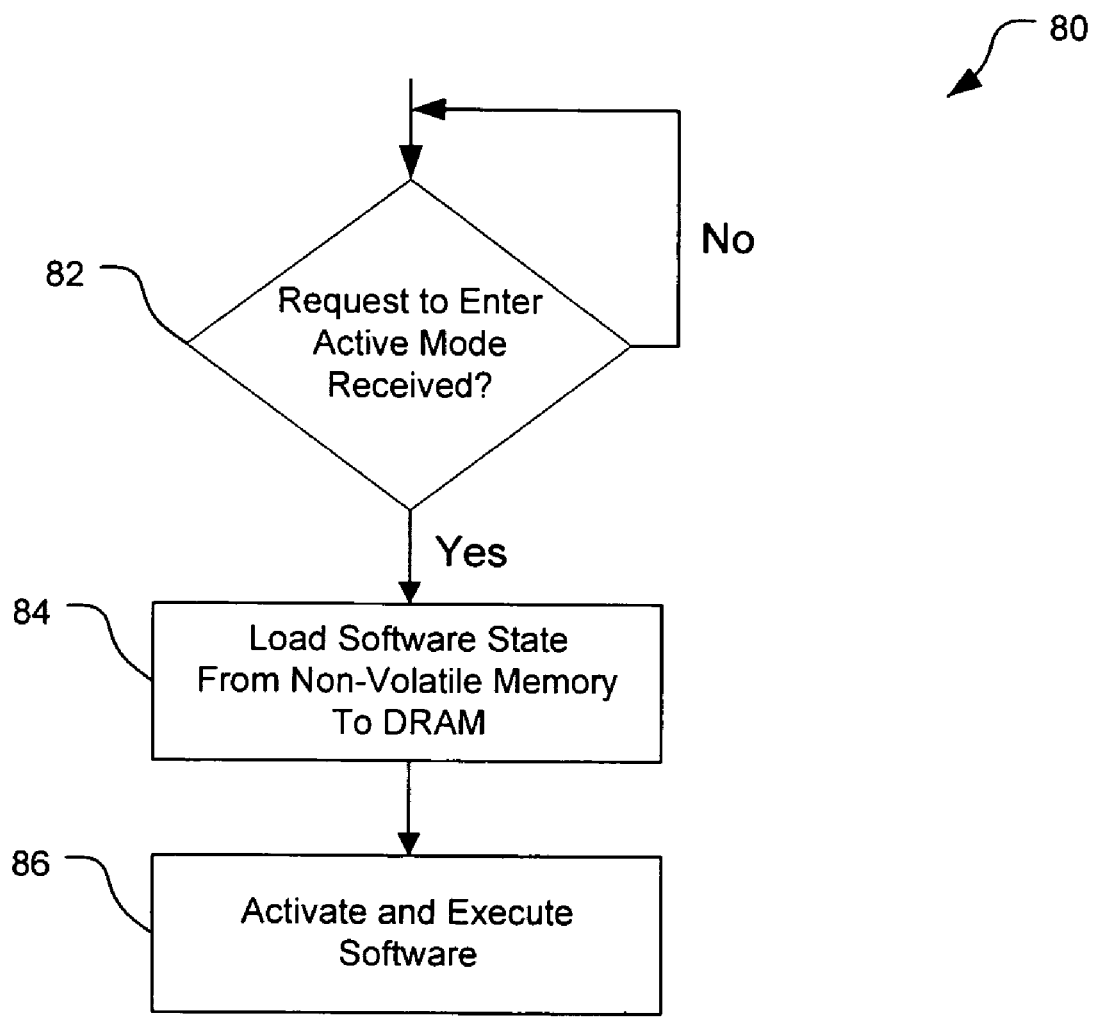

In operation, referring to FIG. 4, with further reference to FIG. 1, a process 80 for initiating an active mode of the system 10 includes the stages shown. The process 80, however, is exemplary only and not limiting. The process 80 may be altered, e.g., by having stages added, removed, or rearranged.

At stage 82, the system 10 is in the stand-by mode in which the system 10 monitors for a request to transition to the active mode. For example, the processor 36 monitors (periodically or continuously) for an "on" command from the remote control 26 received via the IR receiver 24. The monitoring may be for a very short period of time, e.g., if the system is powered up (e.g., plugged in to a wall outlet) and then shortly thereafter instructed to enter the activate mode. If no request to change to the active mode is received, the system 10 continues to monitor for such a request at stage 72. If such a request is detected, then the process 70 proceeds to stage 74.

At stage 84, the processor 36 causes the DRAM 18 to load a preferred initial software state from the non-volatile memory 22. The processor 36 sends commands to the memory 22 and the DRAM 18 such that the memory 22 accesses its stored desired initial software set and provides this software set to the DRAM 18. The DRAM 18 stores the received software set as the software 28.

At stage 86, the initialized software state is executed. The DRAM 18 activates the software and notifies the processor 36 that the initial software set is ready for use. In response, the processor 36 reads and executes the software 28 to perform appropriate functions for processing incoming information.

Referring to FIGS. 1-4, the processor 36 can perform stages 68 or 86 in accordance with the process 70 shown in FIG. 3. The processor 36 can choose to read and execute portions of the re-activated software state or freshly loaded, prestored software state in accordance with higher-priority functions.

Other embodiments are within the scope and spirit of the invention. For example, due to the nature of software, functions described above can be implemented using software, hardware, firmware, hardwiring, or combinations of any of these. Features implementing functions may also be physically located at various positions, including being distributed such that portions of functions are implemented at different physical locations.

Further, while the description above refers to the invention, the description may include more than one invention.

What is claimed is:

1. A controller for rapidly instituting an active mode of a digital-television enabled system, the system including a first, volatile memory configured to load and store software instructions, the controller comprising:

an input configured to receive first digital audio information and first digital video information;

a first output configured to be coupled to a display and to convey second audio information and second video information toward the display regarding the first audio information and the first video information;

at least one second output configured to be coupled to the first memory and to convey commands to, and receive information from, the first memory; and a processor within the controller configured to be in communication with the first memory and a second memory and configured to perform functions in accordance with software instructions stored in the first memory and the second memory, the processor being further configured to cause the first memory to load software instructions for provision to the processor such that first instructions for processing at least one of the first audio information and the first video information are loaded and stored by the first memory with a higher priority than second instructions for performing other functionality; and wherein the processor is further configured to cause the first memory to load the software instructions for provision to the processor such that the first instructions are loaded and stored by the first memory in parallel with the second instructions being loaded and stored but before completion of loading and storing of the second instructions, the second instructions are loaded and stored only if loading and storing of the first instructions is not inhibited by the loading and storing of the second instructions.

2. The controller of claim 1 wherein the processor is configured to cause the first memory to load the software instructions for provision to the processor such that the first instructions are loaded and stored by the first memory before the second instructions.

3. The controller of claim 1 wherein the first memory is a DRAM.

4. The controller of claim 1 wherein the processor is configured to perform functions in accordance with software instructions, and in response to a request to institute an active mode of a digital-television enabled system, cause the first memory to activate initial software stored in the system during a stand-by mode of the system.

5. The controller of claim 4 wherein the processor is configured to cause the first memory to initiate a self-refresh mode of the first memory.

6. The controller of claim 5 wherein the processor is configured to cause the first memory to store a current software state as the initial software.

7. The controller of claim 6 wherein in order to cause the first memory to activate the initial software, the processor is configured to cause the first memory to re-activate the initial software.

8. The controller of claim 5 wherein the processor is configured to cause the first memory to load the initial software from a non-volatile memory.

9. An integrated circuit chip controller for processing graphical information and for rapidly instituting an active mode of a digital-television enabled system, the system including a first, volatile memory configured to load and store software instructions, the integrated circuit chip controller comprising:

an input configured to receive first digital audio information and first digital video information;

a first output configured to be coupled to a display and to convey second audio information and second video information toward the display regarding the first audio information and the first video information;

at least one second output configured to be coupled to the first memory and to convey commands to, and receive information from, the first memory;

a second memory; and a processor coupled to the second memory and configured to be coupled to the first memory and configured to perform functions in accordance with software instructions stored in the first memory and the second memory, the processor being further configured to, in response to a request to institute an active mode of the system, at least one of:

cause the first memory to load software instructions for provision to the processor such that first instructions for processing at least one of the first audio information and the first video information are loaded and stored by the first memory with a higher priority than second instructions for performing other functionality; and wherein the processor is further configured to cause the first memory to load the software instructions for provision to the processor such that the first instructions are loaded and stored by the first memory in parallel with the second instructions being loaded and stored but before completion of loading and storing of the second instructions, the second instructions are loaded and stored only if loading and storing of the first instructions is not inhibited by the loading and storing of the second instructions.

10. The integrated circuit chip controller of claim 9 wherein the processor is configured cause the first memory to initiate a self-refresh mode of the first memory.

11. The integrated circuit chip controller of claim 9 wherein the processor is configured to cause the first memory to activate initial software stored in the system during a standby mode of the system.

12. The integrated circuit chip controller of claim 11 wherein the processor is configured to cause the first memory to load the initial software from a non-volatile memory.

\* \* \* \* \*